(12) United States Patent
Bradai et al.

(10) Patent No.: US 8,659,659 B2
(45) Date of Patent: Feb. 25, 2014

(54) SYSTEM OF GAUGING A CAMERA SUITABLE FOR EQUIPPING A VEHICLE

(75) Inventors: Benazouz Bradai, Bobigny (FR); Julien Moizard, Paris (FR); Julien Rebut, Paris (FR)

(73) Assignee: Valeo Vision, Bobigny (FR)

( * ) Notice: Subject to any disclaimer, the term of this patent is extended or adjusted under 35 U.S.C. 154(b) by 471 days.

(21) Appl. No.: 12/914,068

(22) Filed: Oct. 28, 2010

(65) Prior Publication Data

US 2011/0102592 A1 May 5, 2011

(30) Foreign Application Priority Data

Oct. 30, 2009 (FR) ...................................... 09 57641

(51) Int. Cl.
*H04N 7/18* (2006.01)
(52) U.S. Cl.
USPC ........................................................ 348/148
(58) Field of Classification Search
USPC .......................................... 348/148; 382/104
See application file for complete search history.

(56) References Cited

U.S. PATENT DOCUMENTS

| | | | |
|---|---|---|---|
| 6,285,393 B1 | 9/2001 | Shimoura et al. | |
| 7,512,494 B2 | 3/2009 | Nishiuchi | |
| 2006/0256198 A1* | 11/2006 | Nishiuchi | 348/148 |
| 2007/0198189 A1* | 8/2007 | Herbin et al. | 701/300 |
| 2008/0007619 A1* | 1/2008 | Shima et al. | 348/118 |

FOREIGN PATENT DOCUMENTS

| | | |
|---|---|---|
| EP | 1722332 A1 | 11/2006 |
| JP | 2003329411 A | 11/2003 |

OTHER PUBLICATIONS

Meng Wu et al: "An Automatic Extrinsic Parameter Calibration Method for Camera-on-Vehicle on Structured Road". Vehicular Electronics and Safety, 2007. ICVES. IEEE International Conference on, IEEE, Piscataway, NJ, USA. Dec. 13, 2007, pp. 1-5, XP031233390. ISBN: 978-1-4244-1265-5.

* cited by examiner

*Primary Examiner* — Andy Rao
*Assistant Examiner* — Jared Walker
(74) *Attorney, Agent, or Firm* — Jacox, Meckstroth & Jenkins

(57) ABSTRACT

A system and process of gauging a camera suitable for equipping a vehicle. The system and process determines at least one value of at least one geometrical parameter of the camera, at least in accordance with an item of information that represents a parameter associated with an object detected by the camera, compares the determined value to a value of reference ($\theta$pitching_ref, $\theta$rolling_ref, $\theta$twisting_ref) of the geometrical parameter of the camera, and controls the geometrical parameter of the camera in accordance with the comparison, particularly by modifying the value of reference in such a way as to gauge the camera.

18 Claims, 2 Drawing Sheets

SYSTEM OF GAUGING A CAMERA SUITABLE FOR EQUIPPING A VEHICLE

CROSS-REFERENCE TO RELATED APPLICATIONS

Figure 1:
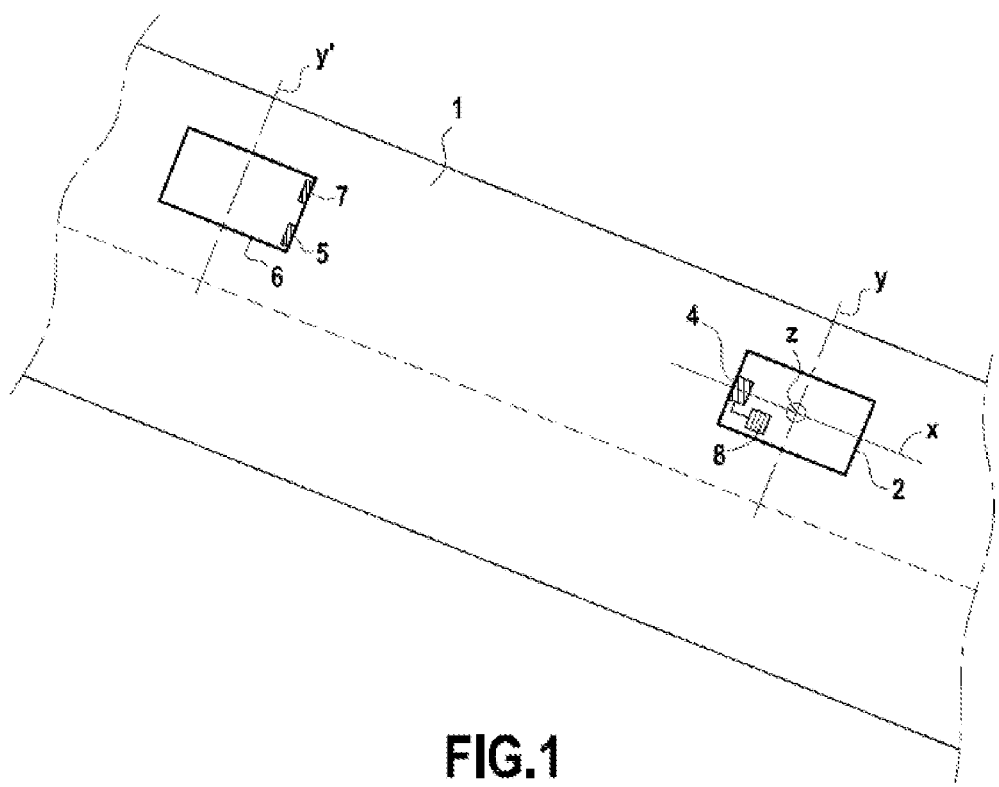

This application claims priority to French Application No. 0957641 filed Oct. 30, 2009, which application is incorporated herein by reference and made a part hereof.

BACKGROUND OF THE INVENTION

1. Field of the Invention

The invention concerns a system of gauging a camera suitable for equipping a vehicle, and a procedure for gauging this camera.

2. Description of the Related Art

Certain motor vehicles are known to comprise at least one camera that particularly serves to detect the presence of an obstacle within an environment of these motor vehicles.

This camera, which is a device for the measurement and return of data, needs to be gauged, in other words calibrated.

The gauging, or calibration, is an operation which concerns the determination of the ratio existing between the indications of the camera and the values of the size to be measured, for example the obstacle, by comparison with a yardstick, which is an instrument that materializes a unit of measurement and serves as reference for the gauging.

This gauging is carried out on a manufacturing chain of the vehicle, thanks to a gauging staff, which has the disadvantage of being very costly.

Also, it is possible that, during the course of the life cycle of the vehicle, the camera moves, for example during the replacement of a bumper of the vehicle on which the camera is arranged.

The problem is therefore that the camera may have to be re-gauged, with the aid of this very costly gauging staff.

A need therefore exists to remedy the aforesaid disadvantages.

SUMMARY OF THE INVENTION

The invention aims to propose a new system of gauging a camera suitable for equipping a vehicle.

The present invention thus has its object a system for gauging a camera suitable for equipping a vehicle, and this system is set up in order to:

determine at least one value of at least one geometrical parameter of the camera, in accordance with at least one item of information that represents a parameter associated with an object detected by the camera;

compare the determined value to a value of reference of the geometrical parameter of the camera; and control the geometrical parameter of the camera in accordance with the comparison, particularly by modifying the value of reference in such a way as to gauge the camera.

The invention particularly makes it possible to gauge dynamically, taking into account at least one parameter associated with an object detected by the camera, at least one geometrical parameter of the camera, which allows the latter to function with optimal performance.

In effect, the system according to the invention allows for automatic gauging of the camera during its life cycle.

Self-gauging, or self-calibration, makes it possible to no longer use costly gauging staffs, particularly on the manufacturing chain of the vehicle on which the camera may be fitted or in an automobile garage for subsequent fitting.

The system also makes it possible to detect that the camera has moved, and automatically correct its geometrical parameters accordingly, in order to ensure the satisfactory functioning of this camera.

Advantageously, the system may be set up so that, when a discrepancy resulting from the comparison between the value of reference of the geometrical parameter of the camera and the determined value presents a value above a threshold pre-determined value, the value of reference can be significantly modified by the determined value.

As a variant, it is possible to modify the value of reference so as to make it converge progressively towards the determined value.

Thus, the geometrical parameter is re-gauged or re-calibrated.

Preferably, the object detected by the camera is a vehicle, other than the vehicle on which the camera is fitted, and the parameter associated with this vehicle may correspond to at least one of the following:

the distance, measured according to a longitudinal axis of the vehicle on which the camera is arranged, between this camera and the rear of the detected vehicle;

the height of rear lamps of the detected vehicle;

the center of gravity of each of the rear lamps of the detected vehicle;

the center of gravity of the detected vehicle; and the position and/or center of gravity of a registration plate of the vehicle.

As a variant, the object detected may be something other than a vehicle.

The parameter associated with this vehicle may depend on a position of a particular zone of the vehicle.

The system may acquire many of the parameters mentioned above in order to determine a value of at least one geometrical parameter of the camera.

It is possible that some of these parameters may be pre-determined, for example the height of the rear lamps of the detected vehicle.

If one so wishes, the system is set up to control the geometrical parameter of the camera as described above, only when the distance between the camera and the rear of the detected vehicle is included within an interval of pre-determined values.

These pre-determined values may, for example, be equal to approximately 20 m and 150 m.

Advantageously, the system is set up to detect several objects in succession in order to determine several values of a geometrical parameter of the camera, store each determined value, and determine a final value that represents this geometrical parameter.

In other words, the system is set up in order to accumulate the determined values of the geometrical parameter of the camera, determine a final value that represents this parameter, compare it with the value of reference of the geometrical parameter of the camera, and modify this value of reference in accordance with the comparison.

According to one example of commissioning the invention, this accumulation of determined values may take place over a pre-determined period, or for a pre-determined number of detected objects.

The final value that represents the parameter may be determined by making an average, for example Gaussian, of the values previously determined.

As a variant, the final value that represents the parameter may be determined by choosing the determined value which appears most often, or an average value included within an interval in which are situated the largest number of determined values.

Preferably, the geometrical parameter of the camera may correspond to at least one of the following:

pitching, which is a movement of rotation around a transversal axis of the vehicle, also known as the axis of pitching;

rolling, which is a movement of rotation around a longitudinal axis of the vehicle, known as the axis of rolling; and twisting, which is a movement of rotation around a vertical axis of the vehicle, known as the axis of twisting, which may entail a change of direction of the vehicle in a horizontal plane.

The value of reference of a geometrical parameter of the camera may correspond to an angular value.

This value of reference is preferably in accordance with the camera used and the vehicle on which this camera is fitted.

The system may be set up to determine an angular value of this geometrical parameter.

Preferably, the system is set up to control the three geometrical parameters of the camera.

According to one example of commissioning the invention, the system is set up in order to:

determine an angular value of pitching of the camera, at least in accordance with an item of information that represents the distance between this camera and the rear of the detected vehicle, and an item of information that represents the height of the rear lamps of the detected vehicle;

compare the determined angular value of pitching to an angular value of reference of pitching of the camera; and control the angular value of pitching of the camera in accordance with the comparison by modifying the angular value of reference of pitching.

According to another example of commissioning the invention, the system is set up in order to:

determine an angular value of rolling the camera, at least in accordance with an item of information that represents the distance between this camera and the rear of the detected vehicle, and of an item of information that represents the center of gravity of each of the rear lamps of the detected vehicle;

compare the determined angular value of rolling to an angular value of reference of rolling of the camera; and control the angular value of rolling the camera in accordance with the comparison by modifying the angular value of reference of rolling.

According to yet another example of commissioning the invention, the system is set up in order to:

determine an angular value of twisting the camera, at least in accordance with an item of information that represents the center of gravity of the object detected by the camera;

compare the determined angular value of twisting to an angular value of reference of twisting the camera; and control the angular value of twisting the camera in accordance with the comparison by modifying the value of reference of twisting.

According to one example of commissioning the invention, the system may be set up to acquire at least one item of information that represents a parameter associated with the vehicle on which the camera is arranged.

This parameter may be at least one of the following:

the structure of the vehicle, corresponding to a position of equilibrium of the vehicle which represents the planarity of the road on which the vehicle is situated; and the angle at the steering wheel of the vehicle, which represents the curve of this road.

As required, the system is set up to control the geometrical parameter of the camera as described above, only when the information that represents the parameter associated with the vehicle on which the camera is situated is included within an interval of pre-determined values.

For example, these intervals may be equal to approximately [−1% rad; 1% rad] in the case of the structure and [−10°; 10°] in the case of the angle at the steering wheel.

According to yet another example of commissioning the invention, the system may be set up to control the geometrical parameter of the camera as described above, only when the vehicle is in motion, particularly at night.

In other words, the system does not control the geometrical parameters of the camera when the vehicle on which the camera is fitted is stationary.

However, the system may control the geometrical parameters when the vehicle is in motion in daylight.

If one so wishes, the system may be implanted inside the camera.

Otherwise, the system may be implanted independently in the vehicle, or in a motor control unit of the vehicle.

The present invention also has as its object a procedure to gauge a camera suitable for equipping a vehicle, and this procedure comprises the following stages:

to determine at least one value of at least one geometrical parameter of the camera, at least in accordance with an item of information that represents a parameter associated with an object detected by the camera;

to compare the determined value to a value of reference of the geometrical parameter of the camera; and to control the geometrical parameter of the camera in accordance with the comparison, particularly by modifying the value of reference in such a way as to gauge the camera.

The invention may be better understood by reading the following detailed description of examples of commissioning the invention which are not limitative, and by examining the attached drawing, on which:

BRIEF DESCRIPTION OF THE ACCOMPANYING DRAWINGS

Figure 2:
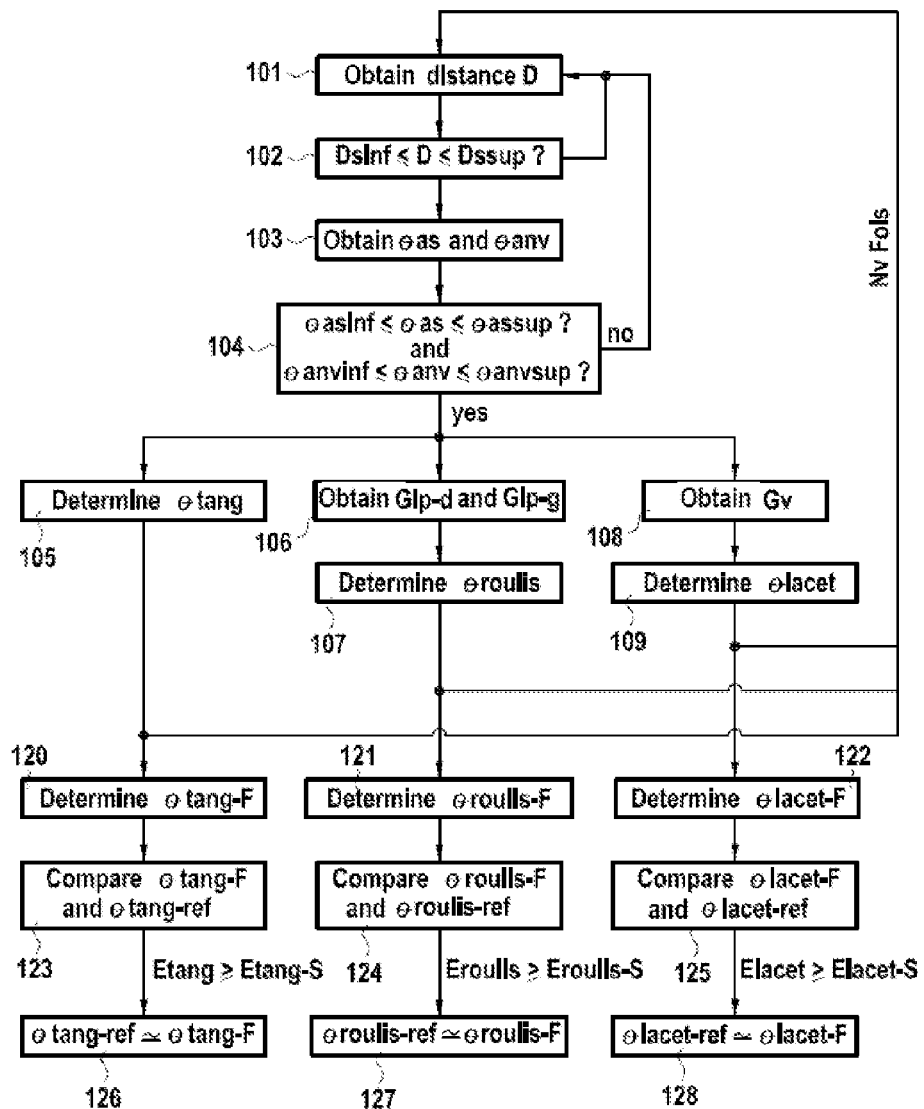

FIG. 1 represents, in diagram form and partially, in perspective, a view of a system of gauging a camera for a motor vehicle in accordance with a mode of realization of the invention; and FIG. 2 corresponds to a block diagram that illustrates different stages of functioning of the system of FIG. 1.

DETAILED DESCRIPTION OF THE PREFERRED EMBODIMENTS

FIG. 1 represents a road 1 on which motor vehicle 2 is travelling.

This motor vehicle 2 comprises a camera 4 arranged on a bumper at the front of this vehicle 2.

This camera 4 is suitable to detect different real objects on road 1, including other vehicles 6, for example for a driving aid device (not represented).

Vehicle 2 comprises a system of gauging 8 of camera 4.

System 8 could be implanted in camera 4.

This system 8 is set up to control the geometrical parameters of camera 4.

In order to do this, system 8 comprise a micro-processor, for example.

These geometrical parameters are:

pitching, which is a movement of rotation around a transversal Y axis of the vehicle 2, also known as the axis of pitching;

rolling, which is a movement of rotation around a longitudinal X axis of the vehicle 2, known as the axis of rolling; and twisting, which is a movement of rotation around a vertical Z axis of the vehicle 2, known as the axis of twisting, which may entail a change of direction of the vehicle 2 in a horizontal plane.

These geometrical parameters are expressed according to angular values:

the angle of pitching θpitching;

the angle of rolling θrolling; and the angle of twisting θtwisting.

The system of gauging 8 only controls these geometrical parameters if vehicle 2 is in motion.

In other words, system 8 does not control the geometrical parameters of camera 4 when vehicle 2 is stationary.

We now go on to describe in greater detail, with reference to FIG. 2, the way in which system 8 allows the gauging of camera 4.

This system of gauging 8 is set up to accommodate (stage 101) an item of information that represents distance D between camera 4 and the rear of detected vehicle 6, this distance D being measured according to the X axis of vehicle 2 on which camera 4 is arranged.

This information D originates from camera 4.

System 8 then makes it possible to compare (stage 102) this distance D to two pre-determined lower Dsinf and upper Dssup threshold values, for example 20 m and 150 m.

If the comparison results in a value D included between values Dsinf and Dssup, system 8 orders to continue gauging camera 4 of vehicle 2.

The system of gauging 8 is set up to accommodate (stage 103) an item of information that represents the structure θas and the angle at the steering wheel θanv of vehicle 2 on which camera 4 is arranged.

These items of information θas and θanv originate from camera 4.

System 8 makes it possible to compare (stage 104) each of these values θas and θanv to two pre-determined lower and upper threshold values, θasinf and θassup, and θanvinf and θanvsup respectively.

For example, these intervals [θasinf; θassup] and [θanvinf; θanvsup] may be equal to approximately [−1% rad; 1% rad] and [−10°; 10°] respectively.

If the comparison results in values θas and θanv included respectively between the values θasinf and θassup, and θanvinf and θanvsup, the system 8 orders to continue to gauge the vehicle 2.

This comparison makes it possible to ensure the planarity of road 1 and the virtually zero curve of this road 1.

In other words, system 8 controls the geometrical parameters of the camera 4 only when road 1 is significantly flat and significantly straight.

System 8 is set up in order to determine an angular value of pitching θpitching of camera 4 (stage 105), in accordance with distance D.

This angular value of pitching is calculated by the following ratio:

$$\theta_{tang} = a\tan\left(\frac{\frac{H_{cam}}{D}}{1 - \frac{Hlp}{Hcam}}\right) + a\tan\left[\left(\frac{H_{image}}{2} - Y_{ref}\right) * \frac{Px}{focale}\right]$$

where:

Hcam represents a pre-determined value of the height of the camera 4 in relation to the ground, this value being in accordance with vehicle 2;

Hlp represents a pre-determined average height of rear lamps 5 and 7 of detected vehicle 6, for example 0.9 m;

Himage represents a height in pixels of an image acquired by camera 4;

Yref represents a Y coordinate, in other words a vertical position, in the image (in pixels) of detected vehicle 6 from the detection of these rear lamps 5 and 7;

Px represents the size of the pixels of the image of camera 4; and lens represents the lens of this camera 4.

System 8 is set up to accommodate an item of information (stage 106) that represents the center of gravity of each of the rear lamps Glp_g and Glp_d of detected vehicle 6.

These items of information Glp_g and Glp_d originate from camera 4.

System 8 is also set up in order to determine, in accordance with distance D and centers of gravity Glp_g and Glp_d, an angular value of rolling θrolling of camera 4 (stage 107).

This value θrolling is determined by calculating an angle between the centers of gravity Glp_g and Glp_d in relation to a transversal Y' axis of vehicle 6, one of the centers of gravity Glp_g and Glp_d being parallel to axis Y on this Y' axis.

System 8 is set up to accommodate an item of information (stage 108) that represents the center of gravity Gv of detected vehicle 6.

This information Gv originates from camera 4.

System 8 is also set up to determine, in accordance with this item of information Gv, an angular value of twisting θlacet of camera 4 (stage 109).

This value θlacet is estimated in accordance with the vertical position of the center of gravity Gv of detected vehicle 6.

Stages 101 to 109 are commissioned for a pre-determined number Nv of times corresponding to a number of vehicles to be detected in order to have an optimal gauging of camera 4.

The Nv values of angles θpitching, θrolling and θtwisting are stored in system 8.

System 8 is then set up to determine, from the Nv values θpitching, θrolling and θtwisting, representative end values θpitching_f, θrolling_f and θtwisting_f of the geometrical parameters of pitching, rolling and twisting (stages 120, 121 and 122).

These representative end values of the geometrical parameters may be determined by carrying out an average, for example Gaussian, of the previously determined values, or as a variant, by choosing the determined value which appears most often, or again by choosing an average value included within an interval in which the largest number of determined values is situated.

System 8 then makes it possible to compare (stage 123 to 125) each of these values θpitching_f, θrolling_f and θtwisting_f to a value of reference, θpitching_ref, θrolling_ref and θtwisting_ref respectively.

If the comparison results in discrepancies Epitching, Erolling and Etwisting in excess of the pre-determined threshold values of discrepancy Epitching_s, Erolling_s and Etwisting_s, system 8 orders the modification (stages 126 to 129) of the values of reference θpitching_ref, θrolling_ref and θtwisting_ref, significantly by the values θpitching_f, θrolling_f or θtwisting_f respectively.

The threshold values of discrepancy Epitching_s, Erolling_s and Etwisting_s may be equal to a common value of approximately 2% rad.

Otherwise, in other words when the comparison results in discrepancies Epitching, Erolling and Etwisting below these pre-determined threshold values of discrepancy Epitching_s, Erolling_s and Etwisting_s, system 8 orders the values of reference θpitching_ref, θrolling_ref and θtwisting_ref to be conserved as values of geometrical parameters (stages not represented).

This order makes it possible to re-gauge camera 4 and thus allow correct measurements to be made by this camera 4.

In other words, system 8 controls the geometrical parameters of camera 4 in order to ensure its satisfactory calibration during its life cycle.

While the system herein described, and the forms of apparatus for carrying this system into effect, constitute preferred embodiments of this invention, it is to be understood that the invention is not limited to this precise system and forms of apparatus, and that changes may be made in either without departing from the scope of the invention, which is defined in the appended claims.

What is claimed is:

1. A system of gauging a camera suitable for equipping a vehicle, said system being set up in order to:
   determine at least one value of at least one geometrical parameter of the camera, in accordance with at least one item of information that represents a parameter associated with an object detected by the camera;
   compare the determined value to a value of reference (θpitching_ref, θrolling_ref, θtwisting_ref) of said at least one geometrical parameter of the camera; and
   control said at least one geometrical parameter of the camera in accordance with said comparison by modifying the value of reference in such a way as to gauge the camera, wherein said control of said at least one geometrical parameter occurs when said vehicle is in motion;
   wherein said object detected by the camera is a detected vehicle, other than the vehicle on which the camera is fitted, and said parameter associated with this detected vehicle is preferably dependant on a position of a certain zone of the detected vehicle; said parameter associated with the detected vehicle corresponds to at least one of the following:
   a distance (D), measured according to a longitudinal (X) axis of the vehicle on which the camera is arranged, between this camera and the rear of the detected vehicle;
   a height (Hlp) of the rear lamps of the detected vehicle;
   a center of gravity (Glp_g, Glp_d) of each of the rear lamps of the detected vehicle;
   a center of gravity (Gv) of the detected vehicle; or
   at least one of a position or center of gravity of a registration plate of the vehicle;
   wherein said system is set up so that, when a discrepancy (Epitching, Erolling, Etwisting) resulting from the comparison between the value of reference of the geometrical parameter of the camera and the determined value presents a value above a pre-determined threshold value (Epitching_s, Erolling_s, Etwisting_s), it can modify the value of reference significantly by the determined value;
   wherein said system is set up to control the geometrical parameter of the camera only when distance (D) between the camera and the rear of a detected vehicle is included within an interval of pre-determined values;
   wherein these values are determined over a pre-determined period, or for a pre-determined number of detected objects (Nv);
   wherein the geometrical parameter of the camera corresponds to at least one of the following:
   pitching, which is a movement of rotation around a transversal (Y) axis of the vehicle, also known as the axis of pitching;
   rolling, which is a movement of rotation around a longitudinal (X) axis of the vehicle, known as the axis of rolling; and
   twisting, which is a movement of rotation around a vertical (Z) axis of the vehicle, known as the axis of twisting.

2. The system according to claim 1, wherein said system is set up so that, when a discrepancy (Epitching, Erolling, Etwisting) resulting from the comparison between the value of reference of the geometrical parameter of the camera and the determined value presents a value above a pre-determined threshold value (Epitching_s, Erolling_s, Etwisting_s), it can modify the value of reference significantly by the determined value.

3. The system according to claim 1, wherein said system is set up to control the geometrical parameter of the camera only when distance (D) between the camera and the rear of a detected vehicle is included within an interval of pre-determined values.

4. The system according to claim 1, wherein said system is set up to detect several objects in succession in order to determine several values of a geometrical parameter of the camera, store each determined value, and determine a final value (θpitching_f, θrolling_f, θtwisting_f) that represents this geometrical parameter.

5. The system according to claim 4, wherein these values are determined over a pre-determined period, or for a pre-determined number of detected objects (Nv).

6. The system according to claim 1, wherein the geometrical parameter of the camera corresponds to at least one of the following:
   pitching, which is a movement of rotation around a transversal (Y) axis of the vehicle, also known as the axis of pitching;
   rolling, which is a movement of rotation around a longitudinal (X) axis of the vehicle, known as the axis of rolling; and
   twisting, which is a movement of rotation around a vertical (Z) axis of the vehicle, known as the axis of twisting.

7. The system according to claim 1, wherein the determined value and the value of reference of the geometrical parameter of the camera are angular values (θpitching, θrolling, θtwisting).

8. The system according to claim 1, wherein said system is set up to acquire at least one item of information that represents a parameter (θas, θanv) associated with the vehicle on which the camera is arranged, particularly the structure and angle at the steering wheel of the vehicle.

9. The system according to claim 8, wherein said system is set up to control the geometrical parameter of the camera only when the information that represents the parameter associated with the vehicle on which the camera is situated is included within an interval of pre-determined values.

10. A process for gauging or calibrating a camera suitable for equipping a vehicle, said process comprising the following stages:
- determining at least one value of at least one geometrical parameter of the camera, at least in accordance with an item of information that represents a parameter associated with an object detected by the camera;
- comparing the determined value to a value of reference (θpitching_ref, θrolling_ref, θtwisting_ref) of said at least one geometrical parameter of the camera; and
- controlling said at least one geometrical parameter of the camera in accordance with said comparison particularly by modifying the value of reference in such a way as to gauge the camera, wherein said control of said at least one geometrical parameter occurs when said vehicle is in motion;
- wherein said object detected by the camera is a detected vehicle, other than the vehicle on which the camera is fitted, and the parameter associated with this detected vehicle is preferably dependant on a position of a certain zone of the detected vehicle; said parameter associated with the detected vehicle corresponds to at least one of the following:
- a distance (D), measured according to a longitudinal (X) axis of the vehicle on which the camera is arranged, between this camera and the rear of the detected vehicle;
- a height (Hlp) of the rear lamps of the detected vehicle;
- a center of gravity (Glp_g, Glp_d) of each of the rear lamps of the detected vehicle;
- a center of gravity (Gv) of the detected vehicle; or
- at least one of a position or center of gravity of a registration plate of the vehicle
  - wherein said system is set up so that, when a discrepancy (Epitching, Erolling, Etwisting) resulting from the comparison between the value of reference of the geometrical parameter of the camera and the determined value presents a value above a pre-determined threshold value (Epitching_s, Erolling_s, Etwisting_s), it can modify the value of reference significantly by the determined value;
- wherein said system is set up to control the geometrical parameter of the camera only when distance (D) between the camera and the rear of a detected vehicle is included within an interval of e-determined values;
- wherein these values are determined over a pre-determined period, or for a pre-determined number of detected objects (Nv);
- wherein the geometrical parameter of the camera corresponds to a least one of the following:
- pitching, which is a movement of rotation around a transversal (Y) axis of the vehicle, also known as the axis of pitching;
- rolling, which is a movement of rotation around a longitudinal (X) axis of the vehicle, known as the axis of rolling; and
- twisting, which is a movement of rotation around a vertical (Z) axis of the vehicle, known as the axis of twisting.

11. The process according to claim 10, wherein said process further comprises the step of:
- modifying the value of reference of the geometrical parameter when a discrepancy (Epitching, Erolling, Etwisting) resulting from the comparison between the value of reference of the geometrical parameter of the camera and the determined value presents a value above a pre-determined threshold value (Epitching_s, Erolling_s, Etwisting_s).

12. The process according to claim 10, wherein said process further comprises the step of:
- controlling the geometrical parameter of the camera only when distance (D) between the camera and the rear of the detected vehicle is included within an interval of pre-determined values.

13. The process according to claim 10, wherein said process further comprises the step of:
- detecting several objects in succession in order to determine several values of a geometrical parameter of the camera, store each determined value, and determine a final value (θpitching_f, θrolling_f, θtwisting_f) that represents this geometrical parameter.

14. The process according to claim 13, wherein said process further comprises the step of:
- determining said values over a pre-determined period, or for a pre-determined number of detected objects (Nv).

15. The process according to claim 10, wherein said geometrical parameter of the camera corresponds to at least one of the following:
- pitching, which is a movement of rotation around a transversal (Y) axis of the vehicle, also known as the axis of pitching;
- rolling, which is a movement of rotation around a longitudinal (X) axis of the vehicle, known as the axis of rolling; and
- twisting, which is a movement of rotation around a vertical (Z) axis of the vehicle, known as the axis of twisting.

16. The process according to claim 10, wherein the determined value and the value of reference of the geometrical parameter of the camera are angular values (θpitching, θrolling, θtwisting).

17. The process according to claim 10, wherein said process is set up to acquire at least one item of information that represents a parameter (θas, θanv) associated with the vehicle on which the camera is arranged, particularly the structure and angle at the steering wheel of the vehicle.

18. The process according to claim 17, wherein said system is set up to control the geometrical parameter of the camera is controlled only when the information that represents the parameter associated with the vehicle on which the camera is situated is included within an interval of pre-determined values.

* * * * *